United States Patent
Wu et al.

(10) Patent No.: US 11,979,860 B2
(45) Date of Patent: May 7, 2024

(54) UPLINK SUMMATION METHOD AND DEVICE, AND DISTRIBUTED ANTENNA SYSTEM

(71) Applicant: SUNWAVE COMMUNICATIONS CO., LTD., Hangzhou (CN)

(72) Inventors: Wenquan Wu, Hangzhou (CN); Xin Wang, Hangzhou (CN); Ailin Ren, Hangzhou (CN)

(73) Assignee: SUNWAVE COMMUNICATIONS CO., LTD., Hangzhou (CN)

( * ) Notice: Subject to any disclaimer, the term of this patent is extended or adjusted under 35 U.S.C. 154(b) by 400 days.

(21) Appl. No.: 17/435,389

(22) PCT Filed: Jul. 28, 2020

(86) PCT No.: PCT/CN2020/105060
§ 371 (c)(1),
(2) Date: Sep. 1, 2021

(87) PCT Pub. No.: WO2021/023054
PCT Pub. Date: Feb. 11, 2021

(65) Prior Publication Data
US 2022/0159635 A1 May 19, 2022

(30) Foreign Application Priority Data
Aug. 2, 2019 (CN) .......................... 201910712548.1

(51) Int. Cl.
*H04W 72/044* (2023.01)
(52) U.S. Cl.
CPC ................ *H04W 72/044* (2013.01)

(58) Field of Classification Search
CPC ..... H04W 88/00; H04W 88/04; H04W 88/08; H04W 88/12; H04W 88/16; H04W 88/18;
(Continued)

(56) References Cited

U.S. PATENT DOCUMENTS

| | | |
|---|---|---|
| 2012/0250740 A1 | 10/2012 | Ling |
| 2015/0063273 A1 | 3/2015 | Kummetz et al. |
| 2018/0097659 A1 | 4/2018 | Hanson |

FOREIGN PATENT DOCUMENTS

| | | |
|---|---|---|
| CN | 101860394 A | 10/2010 |
| CN | 102098255 A | 6/2011 |

(Continued)

OTHER PUBLICATIONS

ISR of PCT/CN2020/105060.
The extended European search report of EP20850837.4.
Fiirst Examination Report of AU2020325457.

*Primary Examiner* — Bo Hui A Zhu (57) ABSTRACT

The present disclosure relates to an uplink summation method and device, and a distributed antenna system. The method comprises: acquiring uplink CPRI data streams of a channel of an AU or an EU in a system, performing bit width extension on the CPRI data streams, and performing full precision summation; extracting an orthogonal IQ signal in the CPRI data streams after summation, and determining a reference value and a detected value of the IQ signal so as to determine attenuation values corresponding to fast fading and slow amplification of the IQ signal; generating a gain table corresponding to CPRI data according to carrier mapping information of the system and the attenuation values; and shifting the IQ signal in the CPRI data streams according to the gain table, and truncating the shifted IQ signal with a preconfigured bit width.

10 Claims, 5 Drawing Sheets

(58) Field of Classification Search
CPC . H04W 72/1268; H04W 72/21; H04W 72/27; H04W 72/29
See application file for complete search history.

(56) References Cited

FOREIGN PATENT DOCUMENTS

| | | |
|---|---|---|
| CN | 109412655 A | 3/2019 |
| CN | 109639356 A | 4/2019 |
| CN | 110492925 A | 11/2019 |
| WO | WO2018099984 A1 | 6/2018 |

UPLINK SUMMATION METHOD AND DEVICE, AND DISTRIBUTED ANTENNA SYSTEM

CROSS-REFERENCE TO RELATED APPLICATIONS

This application is a National Stage application of International application No. PCT/CN2020/105060 filed on Jul. 28, 2020, which claims all benefits accruing from China Patent Application No. 201910712548.1, filed on Aug. 2, 2019, in the China National Intellectual Property Administration, the content of which is hereby incorporated by reference.

TECHNICAL FIELD

The present disclosure generally relates to the technical field of communication, and in particular, to an uplink summation method and device, and distributed antenna system.

BACKGROUND

Currently, a distributed antenna system is considered as a main scheme for wireless coverage of indoor communication and wireless coverage in large outdoor places. Indoor distributed antenna system (DAS) includes an administration unit (AU), a subordinate administration unit (SAU), an extended unit (EU) and a remote unit (RU). Channels of the AU and the SAU can receive downlink signals from a base station, which are digitally processed and transmitted to multiple remote units (RUs) through an optical fiber, and then sent out through an antenna to complete signal coverage. When radio frequency channels of multiple RUs are mapped to the same channel of the AU or the SAU, uplink signals of the RUs will be processed through summation in the EU or the AU, then the processed signals will be transmitted back to the AU or the SAU through an optical fiber, and sent back to the base station through cable for processing. In the summation of digital uplink signals, original bit width may not be able to correctly represent summated signals and an overflow of digital signals may occur, due to a limitation of bit width during digital processing, if no processing of adjusting bit width is done. The overflow of digital signals can cause signal stray in the uplink signal band, which will directly affect receiving sensitivity and coverage range of the base station, reduce user capacity of the system, and even lead to a failure of the whole DAS system.

In the conventional technologies, a summation of signal power is generally calculated and compared with a threshold power. If the summation of signal power is less than the threshold power and no power control is done, no processing will be carried out. If the summation of signal power is greater than the threshold power, an adjustable value will be calculated, and each signal will be processed with the adjustment value to reduce the signal power below the threshold power. A disadvantage of this method is that the summation of signal power needs to be calculated firstly, which requires a multiplication processing module. When each in-phase Quadrature signal (IQ signal for short) is processed, each IQ signal needs to be multiplied by the adjustable value. In the design of the DAS system with multiple channels and large bandwidth, a lot of multiplier resources are required. At the same time, the method needs to process data of each uplink channel in a combined signal respectively. In a system with complex networking, the method is cumbersome and consumes field-programmable gate array (FPGA), i.e., logic resources, which is a challenge for the current FPGA resources and power consumption, and also increases design cost of the DAS system. Another disadvantage of the method is that when calculating the power of the IQ signal, CPRI data streams need to be unframed, each signal needs to be protected against overflow, and each signal needs to be re-mapped, which complicates the system.

For the issue of signal overflow on bit width in the process of summation of digital uplink signals in the distributed antenna system, no solution has been proposed.

SUMMARY

According to various embodiments of the present disclosure, an uplink summation method is provided. The method includes:

acquiring uplink common public radio interface (CPRI) data streams of a channel of an administration unit or a channel of an extended unit in a system, performing a bit width extension on the common public radio interface data streams, and performing a full precision summation of bit width extended data streams;

extracting an orthogonal IQ signal in the common public radio interface data streams after summation, determining a reference value of the IQ signal occupying a carrier container with a unit bandwidth, determining a detected value of the IQ signal occupying the carrier container with the unit bandwidth within a preconfigured time period, and determining a first attenuation value corresponding to fast fading of the IQ signal and a second attenuation value corresponding to slow amplification of the IQ signal based on the reference value and the detected value;

acquiring carrier mapping information of the system, and generating a gain table corresponding to the common public radio interface data according to the carrier mapping information, the first attenuation value and the second attenuation value, wherein the first attenuation value and the second attenuation value in the gain table are in one-to-one correspondence with the carrier mapping information; and shifting the IQ signal in the common public radio interface data streams according to the gain table, and truncating the shifted IQ signal with a preconfigured bit width.

In an embodiment of the present disclosure, the determining a reference value of the IQ signal occupying a carrier container with a unit bandwidth, determining a detected value of the IQ signal occupying the carrier container with the unit bandwidth within a preconfigured time period, and determining a first attenuation value corresponding to fast fading of the IQ signal and a second attenuation value corresponding to slow amplification of the IQ signal based on the reference value and the detected value includes:

acquiring a first maximum value of the IQ signal occupying the carrier container with the unit bandwidth, acquiring a second maximum value of the IQ signal in each channel of the carrier container with the unit bandwidth within a first threshold time according to the first maximum value, acquiring a third maximum value of each IQ signal in each channel of the carrier container with the unit bandwidth within a second threshold time according to the first maximum value, calculating an IQ value corresponding to a rated power transmitted by a distributed antenna system, and increasing the IQ value by a preset increment to generate a set of first reference values for acquiring fast fading; when the IQ value is less than the preset value, the IQ value being used as a second reference value for slow amplification, determining a first detected value based on the second maximum value, and determining a second detected value based on the third maximum value; and acquiring the first attenuation value corresponding to fast fading of the IQ signal based on the first reference values and the first detected value, and acquiring the second attenuation value corresponding to slow amplification of the IQ signal based on the second reference value and the second detected value.

In an embodiment of the present disclosure, the acquiring the first attenuation value corresponding to fast fading of the IQ signal based on the first reference value and the first detected value, and acquiring the second attenuation value corresponding to slow amplification of the IQ signal based on the second reference value and the second detected value includes:

comparing the first detected value with the first reference values from large to small in order, stopping comparing when the first detected value is larger than the first reference value, determining a comparing result between the first detected value and the first reference value, determining the first attenuation value corresponding to fast fading of the IQ signal according to the comparing result, no fast fading of the IQ signal being done when the first detected value is less than a minimum increment of the first reference value; and comparing the second detected value with a minimum threshold value of the second reference value, reducing the second detected value by an attenuation corresponding to a unit increment after the second threshold time when the second detected value is less than the minimum threshold value, determining the second attenuation value corresponding to slow amplification of the IQ signal, no slow amplification of the IQ signal being done when the second detected value is larger than the minimum threshold value.

In an embodiment of the present disclosure, the preset value includes, but is not limited to, one of the following: 0.5 dB, 1 dB, 1.5 dB, 2 dB and 2.5 dB.

In an embodiment of the present disclosure, the shifting the IQ signal in the common public radio interface data streams according to the gain table includes:

shifting the IQ signal in the common public radio interface data streams by three increments according to the gain table, wherein the three increments include 6*N, 3 and 1.5, and the N is equal to 1, 2 or 3.

According to various embodiments of the present disclosure, an uplink summation device is further provided. The device includes a summation module, a detecting module and a gain module.

The summation module is configured for acquiring uplink common public radio interface data streams of a channel of an administration unit or a channel of an extended unit in a system, performing bit width extension on the common public radio interface data streams, and performing full precision summation of bit width extended data streams.

The detecting module is configured for extracting an orthogonal IQ signal in the common public radio interface data streams after summation, determining a reference value of the IQ signal occupying a carrier container with a unit bandwidth, determining a detected value of the IQ signal occupying the carrier container with the unit bandwidth within a preconfigured time period, and determining a first attenuation value corresponding to fast fading of the IQ signal and a second attenuation value corresponding to slow amplification of the IQ signal based on the reference value and the detected value.

The detecting module is further configured for acquiring carrier mapping information of the system, and generating a gain table corresponding to the common public radio interface data according to the carrier mapping information, the first attenuation value and the second attenuation value, wherein the first attenuation value and the second attenuation value in the gain table are in one-to-one correspondence with the carrier mapping information.

The gain module is configured for shifting the IQ signal in the common public radio interface data streams according to the gain table, and truncating the shifted IQ signal with a preconfigured bit width.

In an embodiment of the present disclosure, the gain module is configured for shifting the IQ signal in the common public radio interface data streams by three increments according to the gain table, wherein the three increments include 6*N, 3 and 1.5, and the N is equal to 1, 2 or 3.

According to various embodiments of the present disclosure, a distributed antenna system is further provided. The distributed antenna system includes an administration unit, an extended unit and a remote unit, wherein the administration unit is connected with the extended unit, the administration unit is connected with at least two remote units, the extended unit is connected with at least two remote units, a first summation of uplink common public radio interface data streams of the system is performed in the extended unit through the remote unit, and a second summation of uplink common public radio interface data streams is performed in the administration unit through the extended unit, the first summation and the second summation including:

acquiring uplink common public radio interface data streams of a channel of the administration unit or a channel of the extended unit in a system, performing bit width extension on the common public radio interface data streams, and performing full precision summation of bit width extended data streams;

extracting an orthogonal IQ signal in the common public radio interface data streams after summation, determining a reference value of the IQ signal occupying a carrier container with a unit bandwidth, determining a detected value of the IQ signal occupying the carrier container with the unit bandwidth within a preconfigured time period, and determining a first attenuation value corresponding to fast fading of the IQ signal and a second attenuation value corresponding to slow amplification of the IQ signal based on the reference value and the detected value;

acquiring carrier mapping information of the system, and generating a gain table corresponding to the common public radio interface data according to the carrier mapping information, the first attenuation value and the second attenuation value, wherein the first attenuation value and the second attenuation value in the gain table are in one-to-one correspondence with the carrier mapping information; and shifting the IQ signal in the common public radio interface data streams according to the gain table, and truncating the shifted IQ signal with a preconfigured bit width.

In an embodiment of the present disclosure, the determining a reference value of the IQ signal occupying a carrier container with a unit bandwidth, determining a detected value of the IQ signal occupying the carrier container with the unit bandwidth within a preconfigured time period, and determining a first attenuation value corresponding to fast fading of the IQ signal and a second attenuation value corresponding to slow amplification of the IQ signal based on the reference value and the detected value includes:

acquiring a first maximum value of the IQ signal occupying the carrier container with the unit bandwidth, acquiring a second maximum value of the IQ signal in each channel of the carrier container with the unit bandwidth within a first threshold time according to the first maximum value, acquiring a third maximum value of each IQ signal in each channel of the carrier container with the unit bandwidth within a second threshold time according to the first maximum value, calculating an IQ value corresponding to a rated power transmitted by a distributed antenna system, and increasing the IQ value by 1.5 db to generate a set of first reference values for acquiring fast fading; when the IQ value is less than 1.5 db, the IQ value being used as a second reference value for slow amplification, determining a first detected value based on the second maximum value, and determining a second detected value based on the third maximum value; and acquiring the first attenuation value corresponding to fast fading of the IQ signal based on the first reference values and the first detected value, and acquiring the second attenuation value corresponding to slow amplification of the IQ signal based on the second reference value and the second detected value.

In an embodiment of the present disclosure, the acquiring the first attenuation value corresponding to fast fading of the IQ signal based on the first reference value and the first detected value, and acquiring the second attenuation value corresponding to slow amplification of the IQ signal based on the second reference value and the second detected value includes:

comparing the first detected value with the first reference values from large to small in order, stopping comparing when the first detected value is larger than the first reference value, determining a comparing result between the first detected value and the first reference value, determining the first attenuation value corresponding to fast fading of the IQ signal according to the comparing result, no fast fading of the IQ signal being done when the first detected value is less than the minimum increment of the first reference value; and comparing the second detected value with the minimum threshold value of the second reference value, reducing the second detected value by an attenuation corresponding to a unit increment after the second threshold time when the second detected value is less than the minimum threshold value, determining the second attenuation value corresponding to slow amplification of the IQ signal, no slow amplification of the IQ signal being done when the second detected value is larger than the minimum threshold value.

In an embodiment of the present disclosure, the shifting the IQ signal in the common public radio interface data streams according to the gain table includes:

shifting the IQ signal in the common public radio interface data streams by three increments according to the gain table, wherein the three increments include 6*N, 3 and 1.5, and the N is equal to 1, 2 or 3.

BRIEF DESCRIPTION OF THE DRAWINGS

To describe and illustrate embodiments and/or examples of the present disclosure made public here better, reference may be made to one or more of the figures. The additional details or examples used to describe the figures should not be construed as limiting the scope of any of the present disclosure, the embodiments and/or examples currently described, and the best model of the present disclosure as currently understood.

DETAILED DESCRIPTION OF THE EMBODIMENTS

The present disclosure will be described in detail below with reference to the drawings and specific embodiments. It should be noted that embodiments in the present disclosure and features in the embodiments may be combined with each other when there is no conflict.

Figure 1:
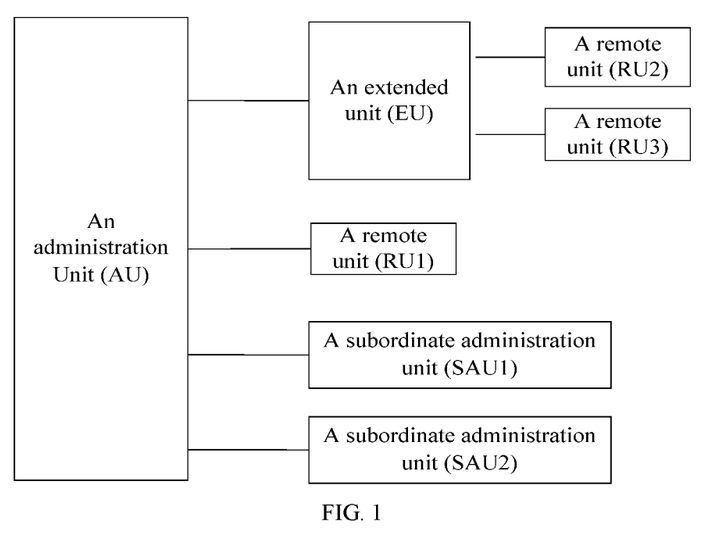
FIG. 1 is a schematic diagram of a DAS system network in an embodiment of the present disclosure.

In an embodiment of the present disclosure, an implementation scheme that can complete an overflow protection function after an uplink signal summation is provided. FIG. 1 is a schematic diagram of a DAS system network in an embodiment of the present disclosure. As shown in FIG. 1, the DAS system network includes an administration unit (AU) and an extended unit (EU). An uplink can support multiple channel signals (omitted and not shown here). The AU is cascaded with a remote unit (RU1) by an optical fiber, the EU is cascaded with remote units (RU2 and RU3), and each RU has multiple radio frequency channels (omitted and not shown here). The DAS system can support more cascades of remote units based on actual needs. The radio frequency channel of the RU1 is mapped to a channel of the AU by carrier mapping function. After uplink signals of a mobile device are received by a channel of the RU2 and a channel of the RU3, a first summation can be completed in the EU. The EU can transmit data streams of IQ signals to the AU through an optical fiber. A second summation can be completed in the AU, and a summation signal can be transmitted to a channel of the AU and then transmitted to a base station for processing.

Figure 2:
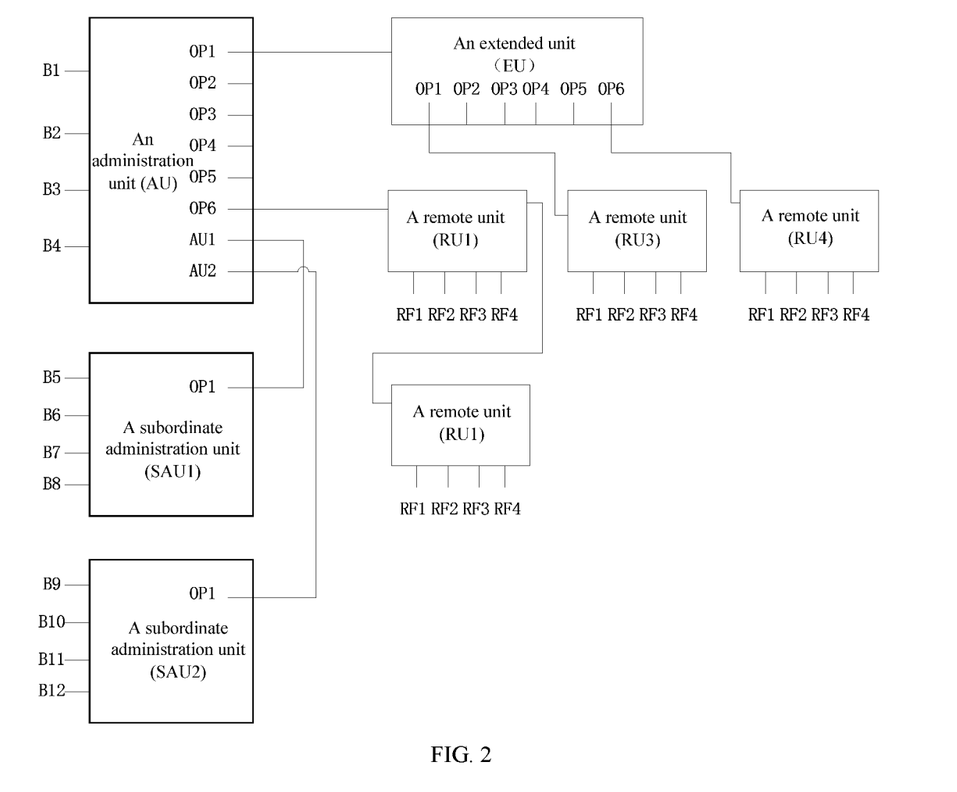
FIG. 2 is a schematic diagram of another DAS system network in an embodiment of the present disclosure.

FIG. 2 is a schematic diagram of another DAS system network in an embodiment of the present disclosure. As shown in FIG. 2, the DAS system network includes the AU and two subordinate administration units (SAU1 and SAU2). The uplink can support 12 channel signals B1 to B12. The AU is cascaded with the RU1 and the EU by an optical fiber, the RU1 is cascaded with the RU2, and the EU is cascaded with a RU3 and a RU4, and each RU has 4 radio frequency channels RF1 to RF4. The DAS system can support more cascades of remote units based on actual needs. The radio frequency channel of the RU1 and the radio frequency channel of the RU2 are mapped to a channel of the AU, the SAU1 or the SAU2. After uplink signals of the mobile device are received by a channel of the RU3 and a channel of the RU4, a first summation can be completed in the EU. The EU can transmit data streams of IQ signals to the AU through an optical fiber. A second summation can be completed in the AU, and a summation signal can be transmitted to one of a channel of the AU, a channel of the SAU1 and a channel of the SAU2 and then transmitted to a base station for processing. A transmission of IQ data and control signals between all units is completed through an optical fiber. The above two DAS system networks can be applied in the embodiment of the present disclosure.

Figure 3:
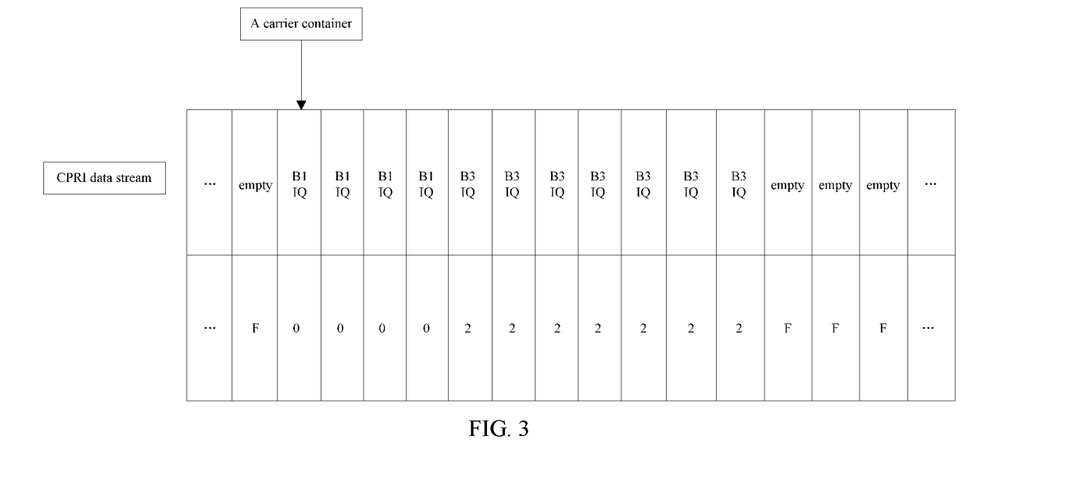
FIG. 3 is a schematic diagram of carrier mapping information on an administration unit in an embodiment of the present disclosure.
Figure 4:
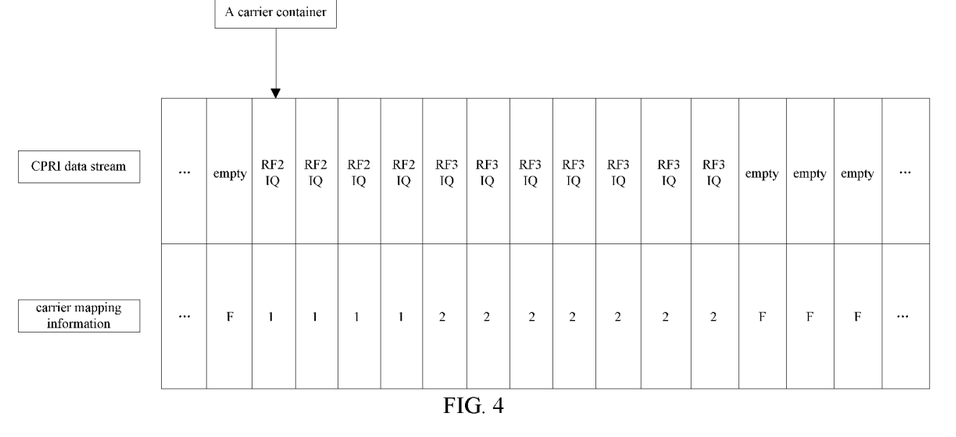
FIG. 4 is a schematic diagram of carrier mapping information on a remote unit in an embodiment of the present disclosure.

In the DAS system, a bandwidth of transmission of the system is limited by a rate of the optical fiber. Data streams of uplink and downlink IQ signals are placed in corresponding positions according to the bandwidth of the signals, and the bandwidth of each uplink and downlink channels and position information on the common public radio interface (CPRI) data streams can be distinguished by carrier mapping flag signal. FIG. 3 is a schematic diagram of carrier mapping information on an administration unit in an embodiment of the present disclosure. As shown in FIG. 3, the IQ signals are splintered together in accordance with certain rules at a preset bit width before data compression and placed in a carrier container, wherein the preset bit width can be 12 bits, and the carrier container is defined to represent a signal bandwidth of 10 M. According to the signal bandwidth, a number of carrier containers consumed by the IQ signals is determined, and the carrier containers are represented by a set of data at a corresponding position below. The next row 0000 in the FIG. 3 represents data streams of the IQ signals in the channel B1 of the AU. Each lattice represents a carrier container, indicating that the bandwidth of this signal is 40 M. Similarly, a bandwidth of the IQ signals in the channel B3 of the AU is 70 M. FIG. 4 is a schematic diagram of carrier mapping information on a remote unit in an embodiment of the present disclosure. As shown in FIG. 4, IQ signals of 40 M are placed on a corresponding position of the CPRI data streams, and carrier mapping information is represented by another set of data. The next row 1111 in FIG. 4 represents the mapping to the channel RF1 of the RU. The mapping of the whole DAS system is that 40 M signal of a RF channel 1 of the AU is mapped to a RF channel 2 of RU1, and the uplink and downlink signals are transmitted at the corresponding positions through these carrier containers. At the same time, the RU3 cascaded with the EU is also mapped to the RF channel 1 of the AU. In the uplink, data streams of IQ signals in the channel can be placed in the same position of the carrier container. These uplink signal stream of the RUs need to be combined in the EU and then transmitted back to the AU. In the present disclosure, an overflow prevention function of uplink summation can be completed at this position.

Figure 5:
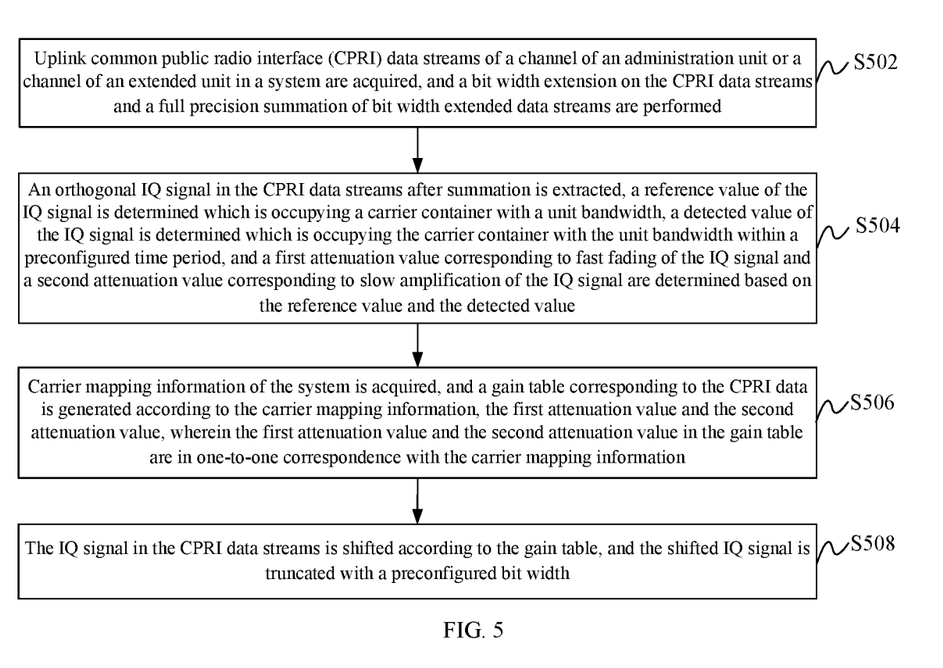
FIG. 5 is a flowchart diagram of an uplink summation method in an embodiment of the present disclosure.

In another embodiment of the present disclosure, FIG. 5 is a flowchart diagram of an uplink summation method in an embodiment of the present disclosure. As shown in FIG. 5, the method includes the following steps:

At step 502, uplink common public radio interface (CPRI) data streams of a channel of an administration unit or a channel of an extended unit in a system are acquired, and a bit width extension on the CPRI data streams and a full precision summation of bit width extended data streams are performed. Because the bit width of binary signals transmitted in the communication system is fixed, in this case, a summation of multiple binary digits may cause that the fixed bit width cannot correctly represent the sum result, resulting in overflow. According to a number of binary digits in the summation, the above-mentioned full precision summation is to extend the binary digits in high sign bits firstly, and then a sum operation is carried out to avoid data overflow.

At step 504, an orthogonal IQ signal in the CPRI data streams after summation is extracted, a reference value of the IQ signal is determined which is occupying a carrier container with a unit bandwidth, a detected value of the IQ signal is determined which is occupying the carrier container with the unit bandwidth within a preconfigured time period, and a first attenuation value corresponding to fast fading of the IQ signal and a second attenuation value corresponding to slow amplification of the IQ signal are determined based on the reference value and the detected value.

The reference value can be determined by calculating an IQ value corresponding to a rated power transmitted by a distributed antenna system (DAS), increasing the IQ value by 1.5 dB to generate a set of first reference values for acquiring fast fading, and using the IQ value less than 1.5 dB as a second reference value for slow amplification. In addition, a second detected value of the IQ signal which is occupying the carrier container with the unit bandwidth can be determined within 4 us, and a third detected value of the IQ signal which is occupying the carrier container with the unit bandwidth can be determined within 30 ms.

At step 506, carrier mapping information of the system is acquired, and a gain table corresponding to the CPRI data is generated according to the carrier mapping information, the first attenuation value and the second attenuation value, wherein the first attenuation value and the second attenuation value in the gain table are in one-to-one correspondence with the carrier mapping information.

At step 508, the IQ signal in the CPRI data streams is shifted according to the gain table, and the shifted IQ signal is truncated with a preconfigured bit width.

According to the above method, the bit width extension on the CPRI data streams and the full precision summation of bit width extended data streams are performed, the orthogonal IQ signal in the CPRI data streams after summation is extracted, the reference value of the IQ signal and the detected value of the IQ signal are determined, the first attenuation value corresponding to fast fading of the IQ signal and the second attenuation value corresponding to slow amplification of the IQ signal are determined, the gain table corresponding to the CPRI data is generated according to the carrier mapping information, the first attenuation value and the second attenuation value, the IQ signal in the CPRI data streams is shifted according to the gain table, and the shifted IQ signal is truncating with a preconfigured bit width. By means of the method, the problem in the related art that the overflow of digital signals on bit width in the process of summation of digital uplink signals in the distributed antenna system can be solved, and the scheme in the present disclosure is simple and has a low power consumption.

In an embodiment of the present disclosure, there are a number of ways to determine the first attenuation value corresponding to fast fading of the IQ signal and the second attenuation value corresponding to slow amplification of the IQ signal according to the reference value of the IQ signal and the detected value of the IQ signal. For example, a first maximum value of the IQ signal is acquired which is occupying the carrier container with the unit bandwidth. A second maximum value of the IQ signal in each channel of the carrier container with the unit bandwidth within a first threshold time is acquired according to the first maximum value, a third maximum value of each IQ signal in each channel of the carrier container with the unit bandwidth within a second threshold time is acquired by parity of reasoning. An IQ value corresponding to a rated power transmitted by a distributed antenna system is calculated, and the IQ value is increased by a preset increment to generate a set of first reference values for fast fading. When the IQ value is less than the preset value, the IQ value can be used as a second reference value for slow amplification, a first detected value is determined based on the second maximum value, and a second detected value is determined based on the third maximum value. The preset value includes, but is not limited to, one of the following: 0.5 dB, 1 dB, 1.5 dB, 2 dB and 2.5 dB.

The first attenuation value corresponding to fast fading of the IQ signal can be determined in a variety of ways. For example, the first detected value can be compared with the first reference values from large to small in order. When the first detected value is larger than the first reference value, the comparing can be stopped, a comparing result between the first detected value and the first reference value is determined, and the first attenuation value corresponding to fast fading of the IQ signal can be determined according to the comparing result. When the first detected value is less than a minimum increment of the first reference value, no fast fading of the IQ signal is done.

The second attenuation value corresponding to slow amplification of the IQ signal can be determined in a variety of ways. For example, the second detected value can be compared with a minimum threshold value of the second reference value. When the second detected value is less than the minimum threshold value, the second detected value can be reduced by an attenuation corresponding to a unit increment after the second threshold time, and the second attenuation value corresponding to slow amplification of the IQ signal can be determined. When the second detected value is larger than the minimum threshold value, no slow amplification of the IQ signal is done. The above ways of determining the first attenuation value corresponding to fast fading and the second attenuation value corresponding to slow amplification have less influence on the link with less power in an uplink combined signal.

Figure 6:
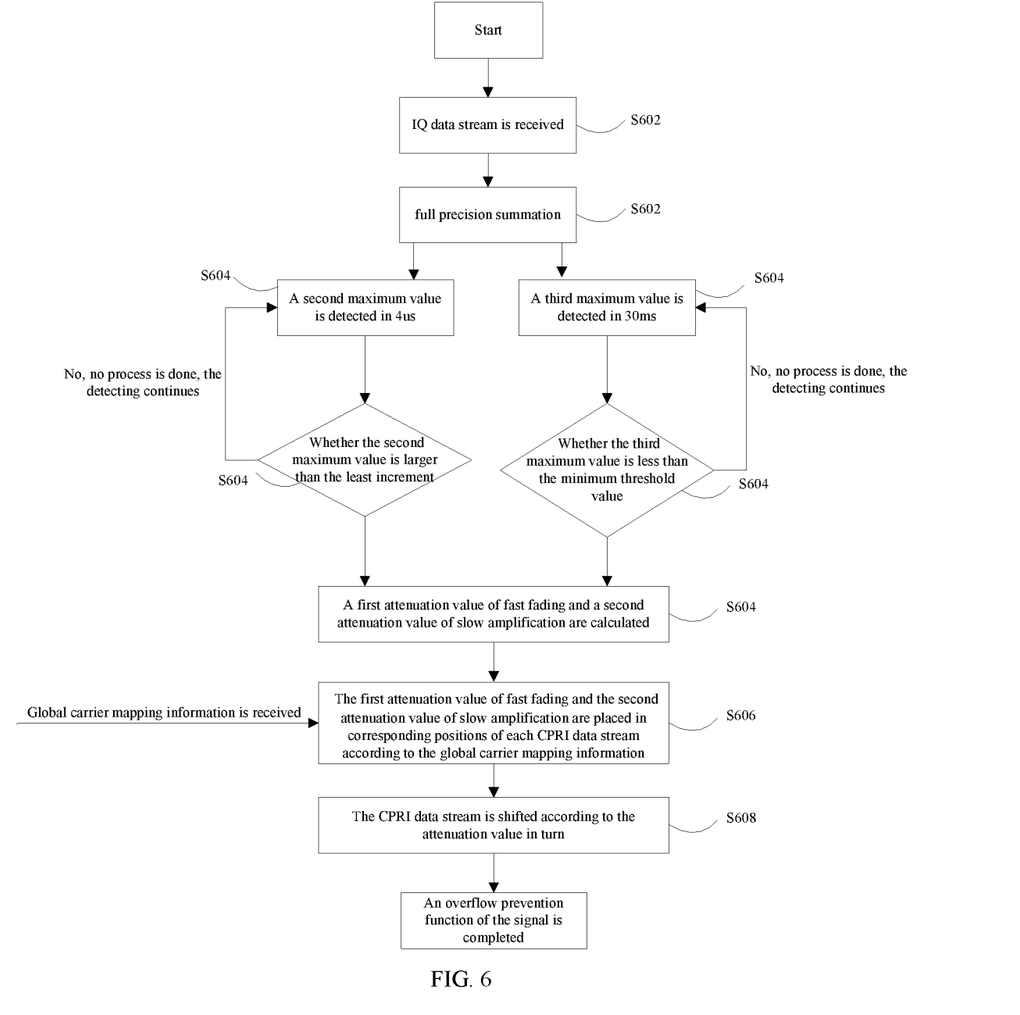
FIG. 6 is a flowchart diagram of a protection treatment of an uplink summation overflow in an embodiment of the present disclosure.

In an embodiment of the present disclosure as shown in FIG. 6 which is a flowchart diagram of a protection treatment of an uplink summation overflow in an embodiment of the present disclosure, the treatment includes the following steps:

At step 602, a full precision summation of CPRI data streams is performed through a bit width extension in the EU or the AU. As described in the above description about the carrier mapping, uplink data streams transmitted to the same channel of the AU are placed in the same location, so that the CPRI data streams mapped to the same channel of the AU can be summed directly. In the present embodiment, CPRI data streams of up to 8 optical ports are summed in the EU and the AU. Therefore, it is necessary to extend the bit width of the IQ signal after summation by 4 bits to complete the full precision summation without distortion.

At step 604, firstly, the data in the carrier container with a unit bandwidth of 10 M are taken out in order of an existing filling rule of the IQ signal. Absolute values of the data are calculated and the first maximum value out of the absolute values is determined. Next, the second maximum value in the carrier container with unit bandwidth of 10 M within a first threshold time of 4 us is calculated, and the second maximum value is used as the first detected value for rapid response of overflow protection. The value of the IQ signal at every 1.5 dbm can be calculated without a calculation of signal power. The first reference values can be set with an increment of 1.5, the minimum of 0 and the maximum of 21. The first detected value can be compared with the first reference values from large to small in order, until the first detected value is larger than the first reference value. A 4-bits value is used to indicate how many increments the first detected value is larger than the first reference value, and the 4-bits value is saved. When the first detected value is less than the minimum increment of the first reference value, no fast fading of the IQ signal is done. The third maximum value of the 10 M carrier container within a second threshold time as 30 ms is calculated, and the third maximum value is used as the second detected value of the slow amplification of the overflow protection. The second detected value can be compared with the minimum threshold value of the second reference value. When the second detected value is less than the minimum threshold value, the second detected value can be reduced by attenuation with an increment equal to 1.5 every 30 ms. When the second detected value is larger than the minimum threshold value, no slow amplification of the IQ signal is done.

Figure 7:
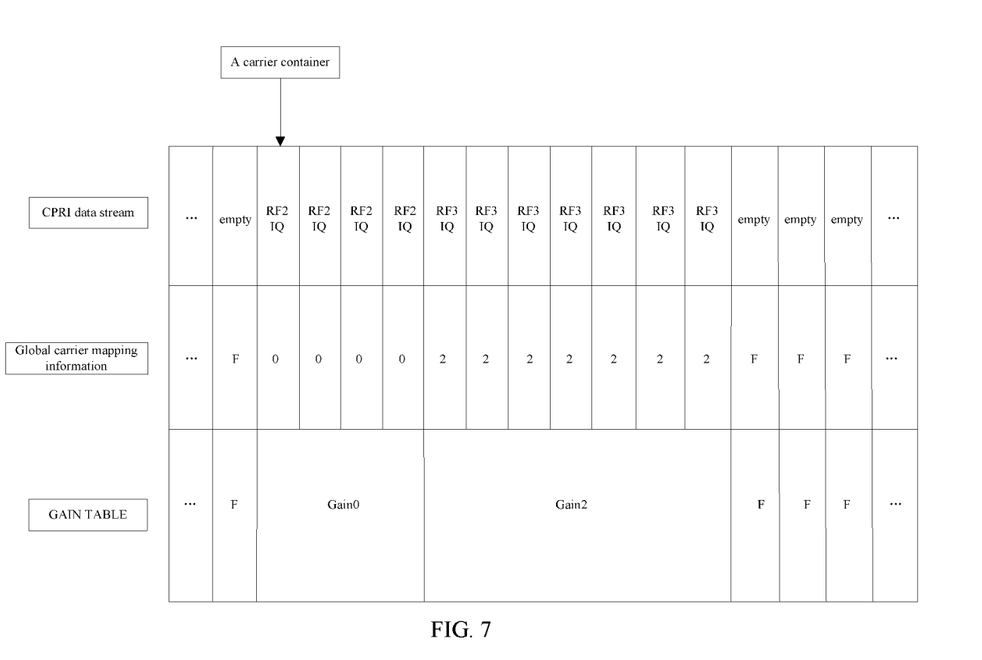
FIG. 7 is a schematic diagram of carrier mapping information corresponding to a gain table in an embodiment of the present disclosure.

At step 606, carrier mapping information of the distributed antenna system is acquired, and a gain table corresponding to the CPRI data is generated according to the carrier mapping information, the first attenuation value and the second attenuation value. In order to process the data streams of IQ signals of 12 uplink channels in real time at step 606, a global carrier mapping information of the whole DAS system needs to be delivered through the AU. It mainly aims to obtain carrier mapping information of 12 channels among the AU and two SAU from the global carrier mapping information. 0 to 11 are used to represent the 12 channels in order and corresponding to mapping bandwidths of the AU and the RU. According to a mechanism of the carrier container storing CPRI data streams of the 12 channels, the data streams of 12 IQ signals in each frame is processed in order in a pipeline manner, and the data in the next frame is processed in the same way. The pipeline processing method simplifies the process and saves logical resources. FIG. 7 is a schematic diagram of carrier mapping information corresponding to a gain table in an embodiment of the present disclosure. As shown in FIG. 7, a protection processing value (the attenuation value of fast fading and the attenuation value of slow amplification) of each uplink is detected in order and corresponding to the carrier mapping information one-to-one, and gain table signal stream is generated, wherein Gain0 and Gain2 are gain values corresponding to the attenuation value.

At step 608, the IQ signal in the CPRI data streams is shifted according to the gain table. The IQ signal in the CPRI data streams can be shifted by three increments, wherein the three increments include 6*N, 3 and 1.5, and the N is equal to 1, 2 or 3. Specifically, the three increments are set as 6*N, 3 and 1.5 respectively. The three increments are used for the function of fast fading. An output gain table signal is arranged in order according to carrier mapping signal, and the output gain table signal is represented by 4 bits data. When higher 2 bits data of the 4 bits data is not 0, the IQ signal is processed according to 6 of the first increment. According to the value of the higher 2 bits data, the IQ signal can be decayed by a multiple of 6. In the data processing process of the IQ signal, corresponding to right shifting of complementary sign bit of the IQ signal by 1 bit to 3 bits, the IQ signal can be decayed by 6, 12, 18. At the same time, lower 2 bits control value of the 4 bits data represents decaying the IQ signal by 3 or 1.5, when the second bit value is 1, decaying the IQ signal by 3. The data of the IQ signal after the first increment process is processed in two parts to complete the attenuation by 3. In a first part, the complementary sign bit of the data of the IQ signal after the first increment process is right shifted by one bit, followed by adding the right shifting complement sign bit by three bits. In a second part, the complementary sign bit of the data of the IQ signal after the first part is right shifted by three bits, followed by adding the data of the IQ signal after the first part to complete the attenuation by 3. When the lowest bit value is 1, the IQ signal can be decayed by 1.5, and an attenuation process is still done in two parts. In a third part, the complementary sign bit of the data of the IQ signal after second increment process is right shifted by three bits, followed by adding the data of the IQ signal after the second increment process. In a fourth part, the complementary sign bit of the data of the IQ signal after the third part is right shifted by one bit, followed by adding the right shifting complementary sign bit by three bits to complete the attenuation by 1.5. After the shifting process is completed, 12 bits data is intercepted according to a certain bit width, and the overflow prevention function of the signal is completed. Because this scheme is completed on the CPRI data streams in pipeline mode through the global carrier mapping information, the processed IQ signal can be directly transmitted to the CPRI frame through optical fiber without re-doing the CPRI frame group and carrier mapping, which saves process of the frame and realizes simplification of the system.

Figure 8:
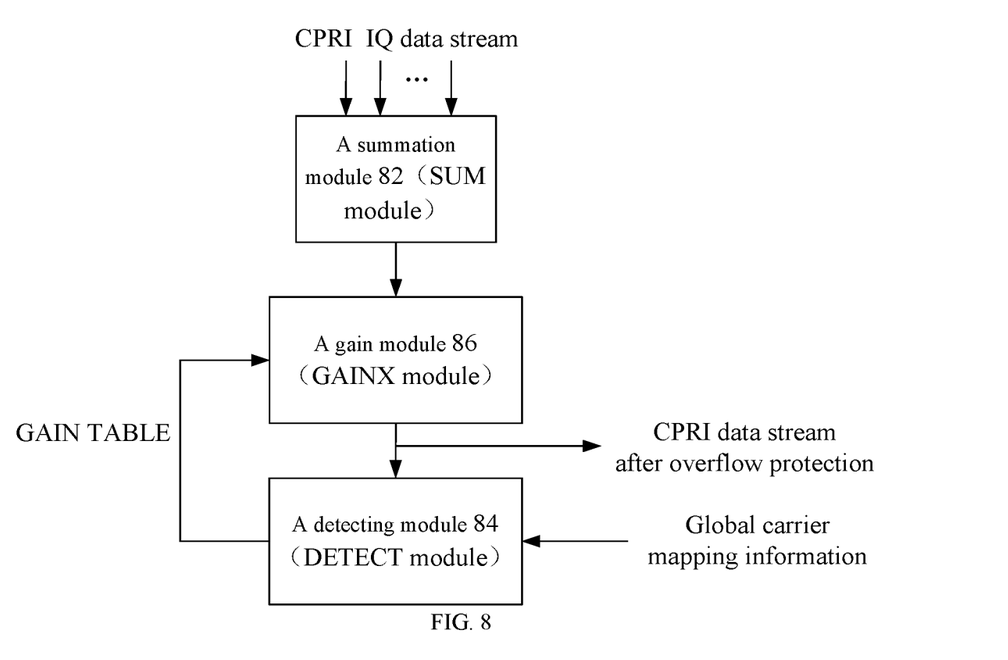
FIG. 8 is a schematic diagram of an uplink summation device in an embodiment of the present disclosure.

In an embodiment of the present disclosure, an uplink summation device is further provided. FIG. 8 is a schematic diagram of an uplink summation device in an embodiment of the present disclosure. As shown in FIG. 8, the device includes a summation module 82 (SUM module), a detecting module 84 (DETECT module) and a gain module 86 (GAINX module).

The summation module 82 is configured for acquiring uplink common public radio interface data streams of a channel of an administration unit or a channel of an extended unit in a system, performing bit width extension on the common public radio interface data streams, and performing full precision summation of bit width extended data streams.

The detecting module 84 is configured for extracting an orthogonal IQ signal in the common public radio interface data streams after summation, determining a reference value of the IQ signal occupying a carrier container with a unit bandwidth, determining a detected value of the IQ signal occupying the carrier container with the unit bandwidth within a preconfigured time period, and determining a first attenuation value corresponding to fast fading of the IQ signal and a second attenuation value corresponding to slow amplification of the IQ signal based on the reference value and the detected value.

The detecting module 84 is further configured for acquiring carrier mapping information of the system, and generating a gain table corresponding to the common public radio interface data according to the carrier mapping information, the first attenuation value and the second attenuation value, wherein the first attenuation value and the second attenuation value in the gain table are in one-to-one correspondence with the carrier mapping information.

The gain module 86 is configured for shifting the IQ signal in the common public radio interface data streams according to the gain table, and truncating the shifted IQ signal with a preconfigured bit width.

According to the uplink summation device, each optical channel of the EU and the AU receives uplink CPRI data streams of each channel and performs full precision summation in the SUM module. After the summation, the data enters into the GAINX module. The gain table calculated by the DETECT module is arranged in order according to the carrier mapping signals, to adjust the IQ signal of the CPRI data streams after the summation in real time to complete the overflow prevention function of uplink summation. At the same time, the adjusted CPRI data streams are transmitted to the optical fiber as an output. The above summation scheme can be multiplexed in the EU and the AU. The problem in the related art that the overflow of digital signals on bit width in the process of summation of digital uplink signals in the distributed antenna system is solved, and the scheme in the present disclosure is simple and has a low power consumption In an embodiment of the present disclosure, a distributed antenna system is further provided. The distributed antenna system includes an AU, an EU and a RU, wherein the AU is connected with the EU, the AU is connected with at least two RUs, the EU is connected with at least two RUs, a first summation of uplink common public radio interface data streams of the system is performed in the EU through the RU, and a second summation of uplink common public radio interface data streams is performed in the AU through the EU, the first summation and the second summation including:

uplink common public radio interface data streams of a channel of an administration unit or a channel of an extended unit in a system are acquired, and a bit width extension on the CPRI data streams and a full precision summation of bit width extended data streams are performed;

an orthogonal IQ signal in the CPRI data streams after summation is extracted, a reference value of the IQ signal is determined which is occupying a carrier container with a unit bandwidth, a detected value of the IQ signal is determined which is occupying the carrier container with the unit bandwidth within a preconfigured time period, and a first attenuation value corresponding to fast fading of the IQ signal and a second attenuation value corresponding to slow amplification of the IQ signal are determined based on the reference value and the detected value;

carrier mapping information of the system is acquired, and a gain table corresponding to the CPRI data is generated according to the carrier mapping information, the first attenuation value and the second attenuation value, wherein the first attenuation value and the second attenuation value in the gain table are in one-to-one correspondence with the carrier mapping information; and the IQ signal in the CPRI data streams is shifted according to the gain table, and the shifted IQ signal is truncated with a preconfigured bit width.

According to the above system, a bit width overflow protection can be realized quickly response to the summation summed signal in the CPRI data streams in the AU or the EU, which can solve the problem of digital signal overflow in the uplink summation process of DAS. The scheme can be completed without using the Digital Signal Process (DSP) resources of FPGA, and with less FPGA resource consumption. The scheme is easy to implement with a low power consumption, and can reduce impact on a link with less power in the uplink combined signal.

In another embodiment of the present disclosure, software is also provided for executing the technical solution described in the above embodiments.

In another embodiment of the present disclosure, a storage medium is provided. The storage medium has stored the software thereon, and the storage medium includes, but is not limited to, an optical disk, a floppy disk, a hard disk, an erasable memory, etc.

A person skilled in the art can understand that all or part of the process in the method of the above embodiment can be accomplished by instructing the associated hardware by a computer program, which may be stored in a non-volatile computer readable storage medium. The computer program may include the process of each method in the above embodiments when executed. Any reference to a memory, a database or other medium used in each embodiment provided by the present disclosure may include at least one of a non-volatile memory and a volatile memory. The non-volatile memory may include a Read-Only Memory (ROM), a programmable ROM (PROM), an electrically programmable ROM (EPROM), an electrically erasable programmable ROM (EEPROM), or a flash memory. The volatile memory may include a Random Access Memory (RAM) or an external cache memory. As an illustration rather than a limitation, the RAM is available in a variety of forms, such as a Static Random Access Memory (SRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a Synchronous Link Dynamic Random Access Memory (SLDRAM), a Rambus Direct Random Access Memory (RDRAM), a Direct Rambus Dynamic Random Access Memory (DRDRAM), a Rambus Dynamic Random Access Memory (RDRAM), etc.

The technical features of the above-described embodiments may be combined in any summation. For the sake of brevity of description, not all possible summations of the technical features in the above embodiments are described. However, as long as there is no contradiction between the summations of these technical features, all should be considered as within the scope of this disclosure.

The above-described embodiments are merely illustrative of several embodiments of the present disclosure, and the description thereof is relatively specific and detailed, but is not to be construed as limiting the scope of the disclosure. It should be noted that a plurality of variations and modifications may be made by those skilled in the art without departing from the spirit and scope of the disclosure. Therefore, the scope of the disclosure should be determined by the appended claims.

We claim:

1. An uplink summation method, comprising:
   acquiring uplink common public radio interface data streams of a channel of an administration unit or a channel of an extended unit in a system, performing a bit width extension on the common public radio interface data streams, and performing a full precision summation of bit width extended data streams;
   extracting an orthogonal IQ (in-phase Quadrature) signal in the common public radio interface data streams after the summation, determining a reference value of the IQ signal occupying a carrier container with a unit bandwidth, determining a detected value of the IQ signal occupying the carrier container with the unit bandwidth within a preconfigured time period, and determining a first attenuation value corresponding to fast fading of the IQ signal and a second attenuation value corresponding to slow amplification of the IQ signal based on the reference value and the detected value;
   acquiring carrier mapping information of the system, and generating a gain table corresponding to the common public radio interface data streams according to the carrier mapping information, the first attenuation value and the second attenuation value, wherein the first attenuation value and the second attenuation value in the gain table are in one-to-one correspondence with the carrier mapping information; and
   shifting the IQ signal in the common public radio interface data streams according to the gain table, and truncating the shifted IQ signal with a preconfigured bit width.

2. The uplink summation method of claim 1, wherein the determining a reference value of the IQ signal occupying a carrier container with a unit bandwidth, determining a detected value of the IQ signal occupying the carrier container with the unit bandwidth within a preconfigured time period, and determining a first attenuation value corresponding to fast fading of the IQ signal and a second attenuation value corresponding to slow amplification of the IQ signal based on the reference value and the detected value comprises:
   acquiring a first maximum value of the IQ signal occupying the carrier container with the unit bandwidth, acquiring a second maximum value of the IQ signal in each channel of the carrier container with the unit bandwidth within a first threshold time according to the first maximum value, acquiring a third maximum value of each IQ signal in each channel of the carrier container with the unit bandwidth within a second threshold time according to the first maximum value, calculating an IQ value corresponding to a rated power transmitted by a distributed antenna system, and increasing the IQ value by a preset increment to generate a set of first reference values for acquiring fast fading;
   when the IQ value is less than the preset value, the IQ value being used as a second reference value for slow amplification, determining a first detected value based on the second maximum value, and determining a second detected value based on the third maximum value; and
   acquiring the first attenuation value corresponding to fast fading of the IQ signal based on the first reference values and the first detected value, and acquiring the second attenuation value corresponding to slow amplification of the IQ signal based on the second reference value and the second detected value.

3. The uplink summation method of claim 2, wherein the acquiring the first attenuation value corresponding to fast fading of the IQ signal based on the first reference value and the first detected value, and acquiring the second attenuation value corresponding to slow amplification of the IQ signal based on the second reference value and the second detected value comprises:
   comparing the first detected value with the first reference values from large to small in order, stopping comparing when the first detected value is larger than the first reference value, determining a comparing result between the first detected value and the first reference value, determining the first attenuation value corresponding to fast fading of the IQ signal according to the comparing result, no fast fading of the IQ signal being done when the first detected value is less than the minimum increment of the first reference value; and comparing the second detected value with a minimum threshold value of the second reference value, reducing the second detected value by an attenuation corresponding to a unit increment after the second threshold time when the second detected value is less than the minimum threshold value, determining the second attenuation value corresponding to slow amplification of the IQ signal, no slow amplification of the IQ signal being done when the second detected value is larger than the minimum threshold value.

4. The uplink summation method of claim 2, wherein the preset value comprises, one of the following: 0.5 dB, 1 dB, 1.5 dB, 2 dB and 2.5 dB.

5. The uplink summation method of claim 1, wherein the shifting the IQ signal in the common public radio interface data streams according to the gain table comprises:

shifting the IQ signal in the common public radio interface data streams by three increments according to the gain table, wherein the three increments comprise 6*N, 3 and 1.5, and the N is equal to 1, 2 or 3.

6. An uplink summation device, wherein the device comprises:

means for acquiring uplink common public radio interface data streams of a channel of an administration unit or a channel of an extended unit in a system, performing bit width extension on the common public radio interface data streams, and performing full precision summation of bit width extended data streams;

means for extracting an orthogonal IQ (in-phase Quadrature) signal in the common public radio interface data streams after the summation, determining a reference value of the IQ signal occupying a carrier container with a unit bandwidth, determining a detected value of the IQ signal occupying the carrier container with the unit bandwidth within a preconfigured time period, and determining a first attenuation value corresponding to fast fading of the IQ signal and a second attenuation value corresponding to slow amplification of the IQ signal based on the reference value and the detected value; acquiring carrier mapping information of the system, and generating a gain table corresponding to the common public radio interface data according to the carrier mapping information, the first attenuation value and the second attenuation value, wherein the first attenuation value and the second attenuation value in the gain table are in one-to-one correspondence with the carrier mapping information; and means for shifting the IQ signal in the common public radio interface data streams according to the gain table, and truncating the shifted IQ signal with a preconfigured bit width.

7. The uplink summation device of claim 6, wherein the gain module is configured for shifting the IQ signal in the common public radio interface data streams by three increments according to the gain table, wherein the three increments comprise 6*N, 3 and 1.5, and the N is equal to 1, 2 or 3.

8. A distributed antenna system, comprising an administration unit, an extended unit and a remote unit, wherein the administration unit is connected with the extended unit, the administration unit is connected with at least two remote units, the extended unit is connected with at least two remote units, a first summation of uplink common public radio interface data streams of the system is performed in the extended unit through the remote unit, and a second summation of uplink common public radio interface data streams is performed in the administration unit through the extended unit, the first summation and the second summation comprising:

acquiring uplink common public radio interface data streams of a channel of the administration unit or a channel of the extended unit in a system, performing bit width extension on the common public radio interface data streams, and performing full precision summation of bit width extended data streams;

extracting an orthogonal IQ (in-phase Quadrature) signal in the common public radio interface data streams after the summation, determining a reference value of the IQ signal occupying a carrier container with a unit bandwidth, determining a detected value of the IQ signal occupying the carrier container with the unit bandwidth within a preconfigured time period, and determining a first attenuation value corresponding to fast fading of the IQ signal and a second attenuation value corresponding to slow amplification of the IQ signal based on the reference value and the detected value;

acquiring carrier mapping information of the system, and generating a gain table corresponding to the common public radio interface data according to the carrier mapping information, the first attenuation value and the second attenuation value, wherein the first attenuation value and the second attenuation value in the gain table are in one-to-one correspondence with the carrier mapping information; and shifting the IQ signal in the common public radio interface data streams according to the gain table, and truncating the shifted IQ signal with a preconfigured bit width.

9. The distributed antenna system of claim 8, wherein the determining a reference value of the IQ signal occupying a carrier container with a unit bandwidth, determining a detected value of the IQ signal occupying the carrier container with the unit bandwidth within a preconfigured time period, and determining a first attenuation value corresponding to fast fading of the IQ signal and a second attenuation value corresponding to slow amplification of the IQ signal based on the reference value and the detected value comprises:

acquiring a first maximum value of the IQ signal occupying the carrier container with the unit bandwidth, acquiring a second maximum value of the IQ signal in each channel of the carrier container with the unit bandwidth within a first threshold time according to the first maximum value, acquiring a third maximum value of each IQ signal in each channel of the carrier container with the unit bandwidth within a second threshold time according to the first maximum value, calculating an IQ value corresponding to a rated power transmitted by a distributed antenna system, and increasing the IQ value by a preset increment to generate a set of first reference values for acquiring fast fading;

when the IQ value is less than the preset value, the IQ value being used as a second reference value for slow amplification, determining a first detected value based on the second maximum value, and determining a second detected value based on the third maximum value; and acquiring the first attenuation value corresponding to fast fading of the IQ signal based on the first reference values and the first detected value, and acquiring the second attenuation value corresponding to slow amplification of the IQ signal based on the second reference value and the second detected value.

10. The distributed antenna system of claim 9, wherein the acquiring the first attenuation value corresponding to fast fading of the IQ signal based on the first reference value and the first detected value, and acquiring the second attenuation value corresponding to slow amplification of the IQ signal based on the second reference value and the second detected value comprises:

comparing the first detected value with the first reference values from large to small in order, stopping comparing when the first detected value is larger than the first reference value, determining a comparing result between the first detected value and the first reference value, determining the first attenuation value corresponding to fast fading of the IQ signal according to the comparing result, no fast fading of the IQ signal being done when the first detected value is less than the minimum increment of the first reference value; and comparing the second detected value with the minimum threshold value of the second reference value, reducing the second detected value by an attenuation corresponding to a unit increment after the second threshold time when the second detected value is less than the minimum threshold value, determining the second attenuation value corresponding to slow amplification of the IQ signal, no slow amplification of the IQ signal being done when the second detected value is larger than the minimum threshold value.

* * * * *